United States Patent
Yochai

(10) Patent No.: US 11,281,587 B2
(45) Date of Patent: Mar. 22, 2022

(54) SELF-TUNING CACHE

(71) Applicant: Infinidat Ltd., Herzliya (IL)

(72) Inventor: Yechiel Yochai, Moshav Aviel (IL)

(73) Assignee: INFINIDAT LTD., Herzliya Pituach (IL)

( * ) Notice: Subject to any disclaimer, the term of this patent is extended or adjusted under 35 U.S.C. 154(b) by 0 days.

(21) Appl. No.: 15/985,850

(22) Filed: May 22, 2018

(65) Prior Publication Data

US 2019/0205254 A1  Jul. 4, 2019

Related U.S. Application Data

(60) Provisional application No. 62/612,746, filed on Jan. 2, 2018.

(51) Int. Cl.
*G06F 12/0862* (2016.01)
*G06F 12/123* (2016.01)
*G06F 12/0866* (2016.01)

(52) U.S. Cl.
CPC ...... *G06F 12/0862* (2013.01); *G06F 12/0866* (2013.01); *G06F 12/123* (2013.01); *G06F 2212/1021* (2013.01); *G06F 2212/6026* (2013.01)

(58) Field of Classification Search
CPC ............. G06F 12/0862; G06F 12/0866; G06F 12/123; G06F 2212/1021; G06F 2212/6026
See application file for complete search history.

(56) References Cited

U.S. PATENT DOCUMENTS

| 5,452,440 | A * | 9/1995 | Salsburg | G06F 11/3447 |
| | | | | 711/133 |
| 9,798,665 | B1 * | 10/2017 | Yochai | G06F 12/0868 |
| 2004/0267906 | A1 * | 12/2004 | Truty | H04L 29/06 |
| | | | | 709/219 |
| 2005/0071599 | A1 * | 3/2005 | Modha | G06F 9/5016 |
| | | | | 711/170 |
| 2005/0257005 | A1 * | 11/2005 | Jeddeloh | G06F 12/0215 |
| | | | | 711/115 |
| 2011/0173395 | A1 * | 7/2011 | Bhattacharjee | G05D 23/19 |
| | | | | 711/135 |

(Continued)

*Primary Examiner* — William E. Baughman
*Assistant Examiner* — Janice M. Girouard
(74) *Attorney, Agent, or Firm* — Reches Patents

(57) ABSTRACT

A method for managing a cache memory of a storage system, the method may include receiving, by a controller of the storage system, an access request related to a data unit; wherein the receiving occurs while (a) the cache memory stores a group of oldest cached data units, and (b) the data unit is stored in a memory module of the storage system the differs from the cache memory; determining, by the controller, a caching category of the data unit; and preventing from caching the data unit in the cache memory when a hit score of the caching category of the data unit is lower than a hit score of the group of oldest cached data units; and caching the data unit in the cache memory when the hit score of the caching category of the data unit is higher than the hit score of the group of oldest cached data units; wherein the hit score of the caching category of the data unit is indicative of a probability of a cache hit per data unit of the caching category.

13 Claims, 6 Drawing Sheets

(56) References Cited

U.S. PATENT DOCUMENTS

| | | | |
|---|---|---|---|
| 2014/0189203 A1* | 7/2014 | Suzuki | G06F 12/0868 |
| | | | 711/103 |
| 2015/0106582 A1* | 4/2015 | Mai | G06F 3/0649 |
| | | | 711/165 |
| 2015/0120859 A1* | 4/2015 | Kondo | G06F 12/0897 |
| | | | 709/213 |
| 2017/0004110 A1* | 1/2017 | Bhattacharjee | G06F 16/217 |
| 2017/0123988 A1* | 5/2017 | Chun | G06F 12/0862 |
| 2017/0315932 A1* | 11/2017 | Moyer | G06F 12/0862 |

* cited by examiner

|   | Long read | Short read | Long write | Sequential access | Prefetch |
|---|---|---|---|---|---|
| V1 | + | - | + | + | + |
| V2 | + | + | + | + | + |
| ... | | | | | |
| Vn | - | - | - | - | + |

FIG. 1

|  | Sequential reads between 0.5MB-1MB | Sequential R/W≤ 256K | Sequential R/W>2M | Random reads> 1MB | Random writes≤ 256KB |
|---|---|---|---|---|---|
| V1 | - | + | - | - | + |
| V2 | + | + | + | + | - |
| ... | | | | | |
| Vn | - | - | - | - | - |

FIG. 2

SELF-TUNING CACHE

RELATED APPLICATIONS

This application claims priority from U.S. provisional patent 62/612,746 filing date Jan. 2, 2018 which is incorporated herein by reference.

BACKGROUND

Cache memories are used for storing active data so as to shorten data access times and reduce latency of I/O operations. A cache memory stores data that is likely to be accessed, for example the most frequently used data, the most recently used data, and data determined to be accessed according to access patterns detected by prefetch algorithms.

SUMMARY

There may be provided a method, a computer program program and a storage system as illustrated in at least one out of the specification, the drawings and the claims.

There may be provided a method for managing a cache memory of a storage system, the method may include: receiving, by a controller of the storage system, an access request related to a data unit; wherein the receiving occurs while (a) the cache memory stores a group of oldest cached data units, and (b) the data unit may be stored in a memory module of the storage system the differs from the cache memory; determining, by the controller, a caching category of the data unit; preventing from caching the data unit in the cache memory when a hit score of the caching category of the data unit may be lower than a hit score of the group of oldest cached data units; and caching the data unit in the cache memory when the hit score of the caching category of the data unit may be higher than the hit score of the group of oldest cached data units; wherein the hit score of the caching category of the data unit may be indicative of a probability of a cache hit per data unit of the caching category.

The method may include dynamically evaluating hit scores of various caching categories, the various caching categories may include the caching category of the data unit.

The method may include dynamically associating data units to caching categories.

The determining of the caching category of the data unit may be based on access request parameters that may be included in the access request.

The determining of the caching category of the data unit may be based on a logical address included in the access request.

The determining of the caching category of the data unit may be based on at least one parameter out of (a) a time of reception of the access request, (b) a pattern formed by a group of access requests that may include the access request, (c) a length of the data unit, and (d) a type of the access request, wherein the type of the access request may be selected from a read request and a write request.

The determining of the caching category of the data unit may be based on a time of reception of the access request.

The access request belongs to a group of access requests, and wherein the determining of the caching category of the data unit may be based on a pattern formed by the group of access requests.

The determining of the caching category of the data unit may be based on a type of the access request, wherein the type of the access request may be selected from a read request and a write request.

The method further may include determining to evaluate a hit score of a certain caching category that may be not associated with data units that may be stored in the cache memory; caching a sample of data units that belong to the certain caching category in the cache memory; and measuring the hit score of the certain caching category.

There may be provided a computer program product that stores instructions for: receiving, by a controller of the storage system, an access request related to a data unit; wherein the receiving occurs while (a) the cache memory stores a group of oldest cached data units, and (b) the data unit may be stored in a memory module of the storage system the differs from the cache memory; determining, by the controller, a caching category of the data unit; and caching the data unit in the cache memory when a hit score of the caching category of the data unit may be higher than a hit score of the group of oldest cached data units.

There may be provided a storage system that may include a cache memory and a controller; wherein the controller may be configured to receive an access request related to a data unit; wherein the receiving occurs while (a) the cache memory stores a group of oldest cached data units, and (b) the data unit may be stored in a memory module of the storage system the differs from the cache memory; determine a caching category of the data unit; prevent from caching the data unit in the cache memory when a hit score of the caching category of the data unit may be lower than a hit score of the group of oldest cached data units; and facilitating a caching of the data unit in the cache memory when the hit score of the caching category of the data unit may be higher than the hit score of the group of oldest cached data units; wherein the hit score of the caching category of the data unit may be indicative of a probability of a cache hit per data unit of the caching category. The facilitating may include requesting the caching, instructing the caching, participating in the caching, and the like.

There may be provided a method for managing a cache memory of a storage system, the method may include: defining multiple caching categories; calculating hit scores of different caching categories of the multiple caching categories; wherein a hit score of any caching category of the different caching categories may be indicative of a probability of a cache hit per data unit of the caching category; comparing hit scores of the different caching categories to provide a comparison result; wherein the different caching categories may include a certain caching category associated with a group of oldest cached data units that may be stored in the cache memory; and evicting from the cache memory, based on the comparison result, one or more data units associated with a given caching category that differs from the certain caching category when (i) a hit score of the given caching category may be lower than (ii) a hit score of the certain caching category.

The method further may include caching data units of the certain caching category for at least a trial period in order to calculate a hit score of certain caching category; and including the certain caching category in the different caching categories only after an expiration of the trial period.

There may be provided a computer program product that stores instructions for: defining multiple caching categories; calculating hit scores of different caching categories of the multiple caching categories; wherein a hit score of any caching category of the different caching categories may be indicative of a probability of a cache hit per data unit of the caching category; comparing hit scores of the different caching categories to provide a comparison result; wherein the different caching categories may include a certain caching category associated with a group of oldest cached data units that may be stored in the cache memory; and evicting from the cache memory, based on the comparison result, one or more data units associated with a given caching category that differs from the certain caching category when (i) a hit score of the given caching category may be lower than (ii) a hit score of the certain caching category.

There may be provided a storage system that may include a cache memory and a controller; wherein the controller may be configured to: receive or define multiple caching categories; calculate hit scores of different caching categories of the multiple caching categories; wherein a hit score of any caching category of the different caching categories may be indicative of a probability of a cache hit per data unit of the caching category; compare hit scores of the different caching categories to provide a comparison result; wherein the different caching categories may include a certain caching category associated with a group of oldest cached data units that may be stored in the cache memory; and facilitate an evicting from the cache memory, based on the comparison result, one or more data units associated with a given caching category that differs from the certain caching category when (i) a hit score of the given caching category may be lower than (ii) a hit score of the certain caching category.

BRIEF DESCRIPTION OF THE DRAWINGS

In order to understand the invention and to see how it may be carried out in practice, a preferred embodiment will now be described, by way of non-limiting example only, with reference to the accompanying drawings.

Figure 1:
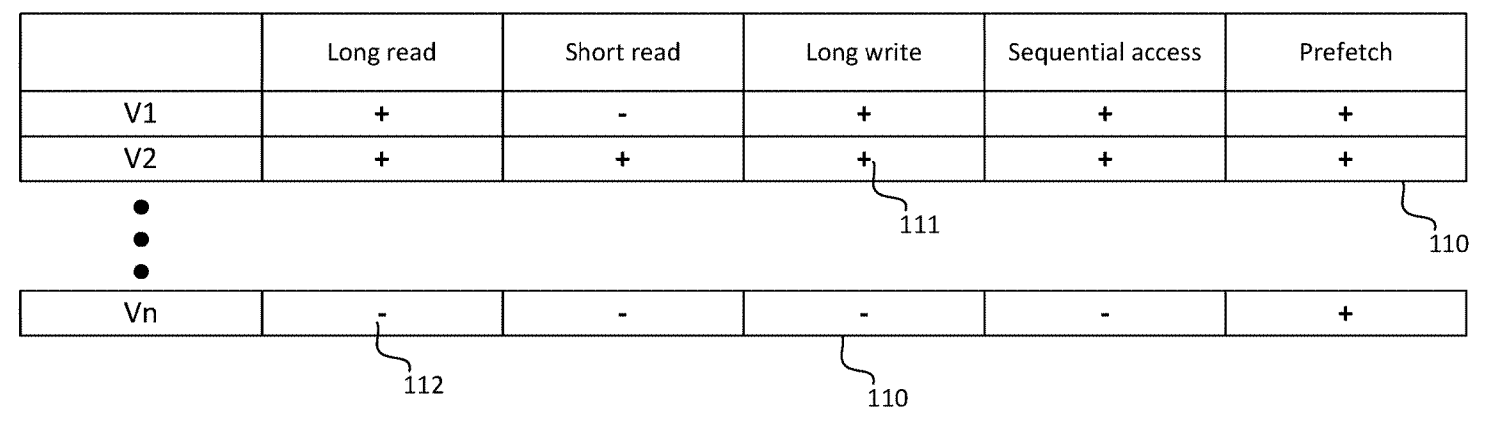

FIG. 1 illustrates an example of caching categories that are arranged in a shape of a table, wherein each column includes caching categories for one volume;

FIG. 2 illustrates an example of caching categories that are arranged in a shape of a table, wherein each column includes caching categories for one volume;

DETAILED DESCRIPTION OF THE DRAWINGS

Figure 3:
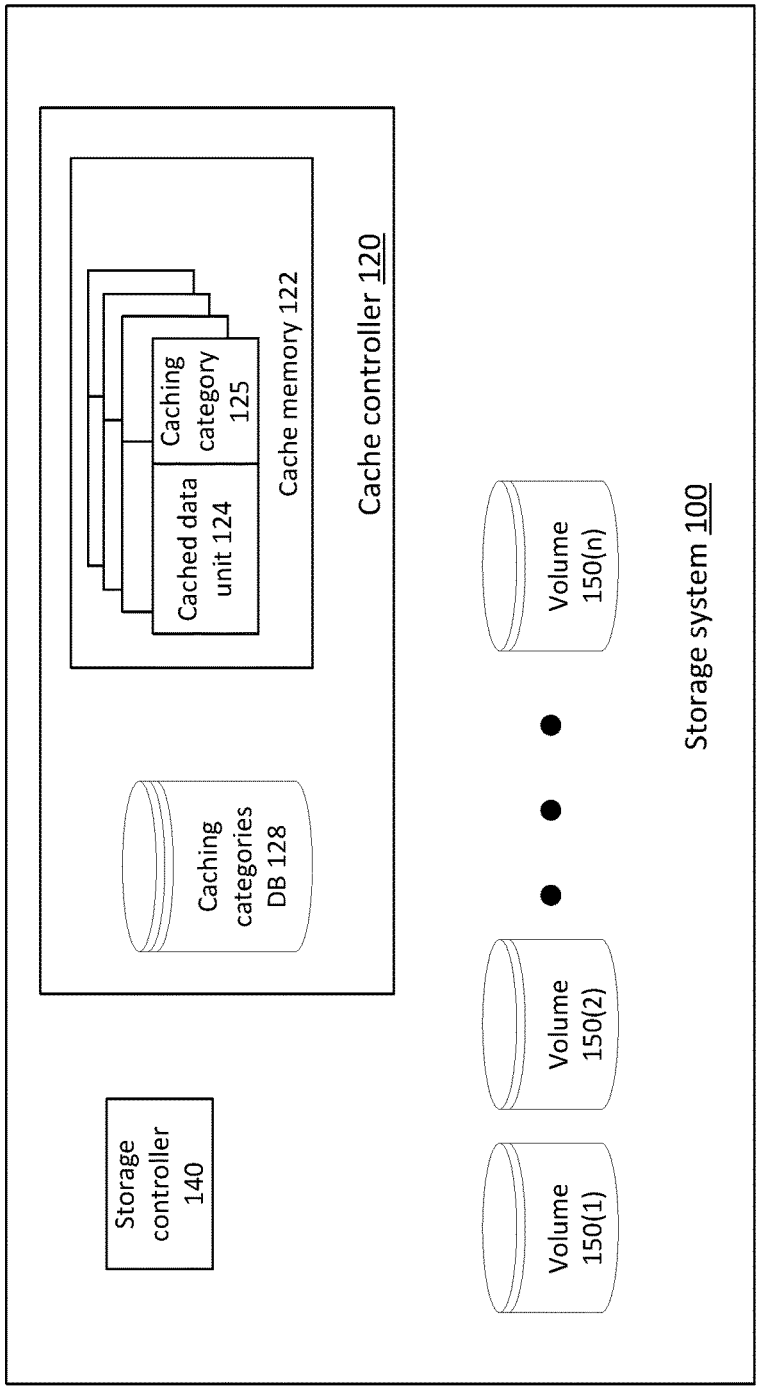
FIG. 3 illustrates an example of a storage system.

Since the cache memory resources are limited, cache algorithms deal with the timing for evicting each cached data so as to free space for new data, and further deals with determinations of which data to admit into the cache memory.

Cache eviction (also called cache replacement policy) is a mechanism for evicting cached data when the cache is full, in order to make room for new data. There are various methods to decide which data is to be evicted: Least Recently Used (LRU), Least Frequently Used (LFU), First In First Out (FIFO) and many more.

Aging algorithm is another eviction policy that decides whether the cached data is to be evicted depending on values of counters used to measure the time that unaccessed data is on the cache or measure the Time To Live (TTL) of the unaccessed data. The aging algorithm associates an initial age value to each new data that is added to the cache or when cached data is re-referenced. The age value decays (or alternatively, increased) as time passes without any access to the data. Data is evicted according to the age value, so that oldest data is first to be evicted.

Hit ratio is a term that defines the percentage of I/O requests served from the cache comparing to the total served I/O requests. Measuring hit ratio towards various cached data units allows evaluating the efficiency of continuing caching the cached data units.

There is a need to determine which data should be cached and when to evict each data, in a dynamic manner, according to the dynamic nature of hit ratio patterns to different data units at different times, and to cache and evict data according to the dynamic determination.

According to embodiments of the present invention, caching categories are defined, and each cached data unit is associated with a caching category. Each caching category can be dynamically defined as excluded from or included in the cache. A caching category can be determined as included—if a hit score of this category (according to measurements of accesses towards cached data units that belong to this category) is above a hit score of a group of oldest cached data units. A caching category can be excluded if the hit score of this category is below the hit score of the group of oldest cached data units. Excluded caching categories can be sampled by caching a small portion (e.g., 2%, 5%, 10%) of data units that belong to the excluded category. A subsequent determination to include an excluded caching category can rely on the sample. The caching category that is associated with each cached data unit can be changed upon each re-access towards the cached data unit.

Hit ratio can vary among volumes and also within one volume—various access properties can lead to different hit ratios.

The access properties can be defined according to one or any combination of: (i) the access requests' explicit parameters: type of access (Read or Write), size of the data to be read or written, addresses within the volume, the accessing entity (the specific application or the host computer that sent the request, or a prefetch module within the storage system that initiated the request); (ii) timing—the time and/or date when the access request was received; (iii) identified pattern with respect to previous access requests: sequential access, random access, any other pattern related to addresses to the current access versus previous accesses.

The following are some examples of different hit rates resulted by different access properties. Random access on a certain volume can result higher hit rate than sequential access on the same volume or vice versa, random access requesting small sized data can lead to high hit rate or otherwise—low hit rate, sequential access requesting large sized data can lead to high hit rate or otherwise—low hit rate, read requests (any read request or certain sizes data read requests) can result high hit rate or low hit rate, write requests (any write request or certain sized data write requests) can result high hit rate or low hit rate, prefetched data may or may not result high hit rate, access requests received during working hours may result higher hit rate than access requests received during the night or during weekends, or vice-versa. Access requests received from a specific application during certain time of day—may result higher or lower hit rate.

Each data unit that is stored in the cache (cached data unit) is assigned with a caching category. A caching category may be indicative of the identity of the storage entity to whom the cached data unit belongs, and further indicative of properties of the recent access to the data. The properties of an access can be for example: read request, write request, long read and/or write request, short read and/or write request, read and/or write request of certain size ranges, sequential read and/or write request, sequential read and/or write request of certain size ranges, random read and/or write request of certain size ranges, prefetch, access at certain time of day/week/month, etc.

The term storage entity may refer to e.g., a volume, a group of volumes, a storage device, a partition within a volume or within a storage device, etc. The term volume is used herein as an example of a storage entity.

The caching category assigned to each cached data unit can be changed upon each time the cached data unit is re-accessed. For example, at various accesses, a certain cached data unit that belongs to a certain volume, can be associated with: sequential read, random read, write of a certain size, different times of day, different accessing entities, etc.

For each caching category, the system determines whether or not data units of the caching category should be cached or not.

FIGS. 1 and 2 illustrates various simplified caching categories 110 that are arranged in a shape of a table, wherein each column includes caching categories for one volume.

FIG. 1 illustrates caching categories for volumes V1, V2, ... Vn, wherein the caching categories 110 per volume are: long reads, short reads, long writes, sequential accesses and prefetch.

FIG. 2 illustrates other examples of caching categories for volumes V1, V2, ... Vn, wherein the caching categories 110 per volume are: Sequential reads between 0.5 MB-1 MB, Sequential R/W≤256K, Sequential R/W>2M, Random reads>1 MB, and Random writes≤256 KB. Though it is illustrated, for the sake of simplicity, as if the same caching categories are handled for all volumes, each volume may be defined with different caching categories to be monitored. The categories may be handled with data structures that differ from a table. The number of categories per volume may be for example sixteen, or any other number.

Each cell 110 in the table indicates a caching category, for example: prefetch for volume V2, long writes for volume Vn.

The content of each cell may indicate whether the caching category is currently included, such as caching category 111 (illustrated as a plus), or the caching category is currently excluded, such as caching category 112 (illustrated as a minus).

FIG. 1 illustrates included caching categories, such as: long read, long write, sequential access, and prefetch for volume V1; all access types towards volume V2; and only prefetch for volume Vn.

FIG. 1 illustrates excluded caching categories, such as: short reads for volume V1; and long read, short read, long write and sequential access for volume Vn.

The term long/short read/write may refer to a predefined size threshold of the data to be read/written. For example, it may be defined that read/write of data of a size below 256 KB is a small read/write, and read/write of data of a size above 256 KB is a long read/write.

The size thresholds may be determined differently per volume, may be set dynamically per each volume, may change over time, and/or there may be several size categories per each volume. Though for the sake of simplicity, only one access request parameter is illustrated per each caching category, a caching category can be defined as a combination of multiple access request parameters.

Each cached data unit may be further associated with an aging parameter. The aging parameter (e.g., TTL—Time To Live) is set to a maximum aging value upon caching the data unit and upon each access to the cached data unit. The aging parameter is decremented periodically.

The term oldest data units, as reflected by the aging parameter, may refer to cached data units that their last access was least recent, e.g., lowest TTL or the TTL is below a certain threshold. Otherwise, each volume and/or each caching category may have another aging (or decline) function for its cached data.

For example, data of certain volumes or certain caching categories may age faster or slower than data of other volumes or caching categories. The different aging rates may be reflected by various setting of the TTL, for example: setting different maximum value for the TTL upon access or upon caching of the data unit, and/or faster decrementing of the TTL. Faster aging data units are assigned with lower initial TTL and/or larger reduction units, while slower aging data units are assigned with a higher initial TTL, and/or smaller reduction units.

Oldest cached data units, e.g., data units with the lowest aging parameter, are candidates to be evicted from the cache memory, when need to cache new data while the cache is full.

For each caching category, a hit score is calculated. The hit score may reflect the chance that a cached data unit of this caching category will be re-accessed, while stored in the cache. The calculation of the hit score may be based on the number of cached data units that belong to the caching category, the ratio between the number of cached data units that belong to the caching category and the number of total cached data units, and the number of hits in this caching category. For example, upon each hit on a cached data unit, the hit score of the caching category related to the cached data unit is incremented by a number that reflects the ratio between the number of cached data units that belong to the caching category (NC) and the number of total cached data units (NT), e.g., +NT/NC, so that a hit for a caching category that counts less data units will weigh more than a hit for a caching category that counts more data units. Periodically, the hit scores of all caching categories will be reduced (e.g., multiplied by two), so as to lower the weight of older hits.

A similar hit score is calculated for a group of oldest cached data units. The oldest cached data units may be defined as cached data units having an aging parameter that is below a certain threshold, or a certain number of cached data units that are oldest among all cached data units according to the aging parameter or other criteria.

The hit score of the oldest cached data units can be compared to a hit score of different caching categories. The hit score of the oldest cached data units can be compared to the hit score of one or more caching categories that are currently included in the cache memory. If a certain caching category that is currently included in the cache memory ("a certain included caching category") has a hit score that is lower than the hit score of the oldest cached data units, it can be determined that the certain included caching category will be excluded from now on, until otherwise is determined.

In order to be able to reverse the decision of excluding a caching category, a small portion, i.e., a certain percentage (e.g., 5%), of the accessed data units that belong to an excluded caching category are cached in the cache memory, so that the hit score of the excluded caching category can still be calculated. For example, if a sample of one of every twenty data units (5%) of the excluded caching category is cached, then the hit score for the entire caching category can be calculated based on the hit score of the sample.

The hit score of the oldest cached data units can be compared to the hit score of one or more caching categories that are currently excluded from the cache memory. The comparison may be against one or more caching categories having the highest hit score among excluded caching categories. If a certain caching category that is currently excluded has a hit score that is greater than the hit score of the group of oldest cached data, the certain excluded caching category will be included from now on in the cache, until otherwise is decided and the oldest cached data units may be evicted.

The determination for whether to include or exclude caching categories can be performed upon various occasions. For example, the determination can be made upon each time a data unit (candidate data unit) is requested to be admitted to the cache. The caching category of the candidate data unit can be determined, based on the volume that includes the candidate data unit and based on the properties of the current access towards the candidate data unit. The current hit score of the caching category to which the candidate data unit belongs can be compared to the hit score of the group of oldest data units, so as to decide whether the caching category is to be included or excluded, and accordingly—whether or not to admit the candidate data unit to the cache.

The determination for whether to include or exclude caching categories can be further performed upon eviction. Upon performing an eviction, the hit score of the group of oldest cached data units is compared to the hit scores of one or more included caching categories. If the hit scores of the group of oldest cached data units is the lowest hit score, then the group of oldest cached data units will be evicted. If another caching category is found to have the lowest hit score, then data units of this caching category will be evicted, and the caching category can be excluded from now on from the cache, until otherwise is determined.

Figure 4:
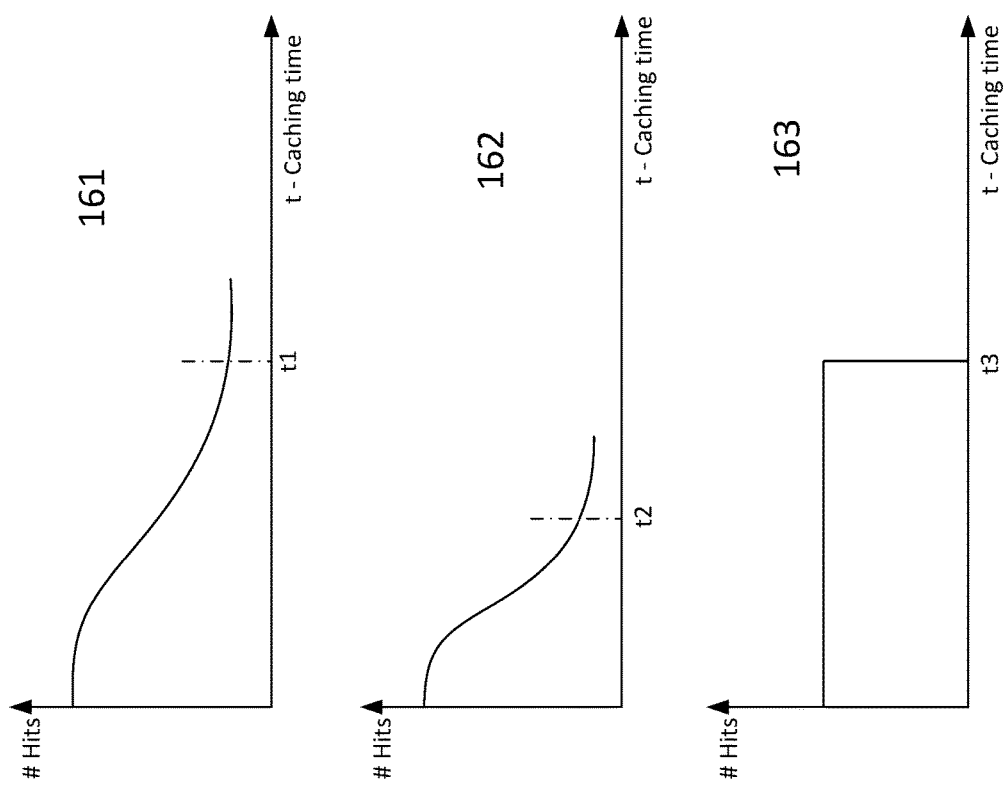
FIG. 4 illustrates a function of hits versus time for three different caching categories.

FIG. 4 illustrates a storage system 100 that includes a storage controller 140, a permanent storage layer that may include multiple disks that may store multiple volumes 150(1)-150(n) of information, and a cache controller 120. The cache controller 120 includes a caching categories database 128 for storing information (such as hit scores) about caching categories. The cache controller 120 may also include a cache memory 122 that stores cached data units 124 and caching category metadata such as a caching category identifier, a caching category parameter, and the like.

Figure 5:
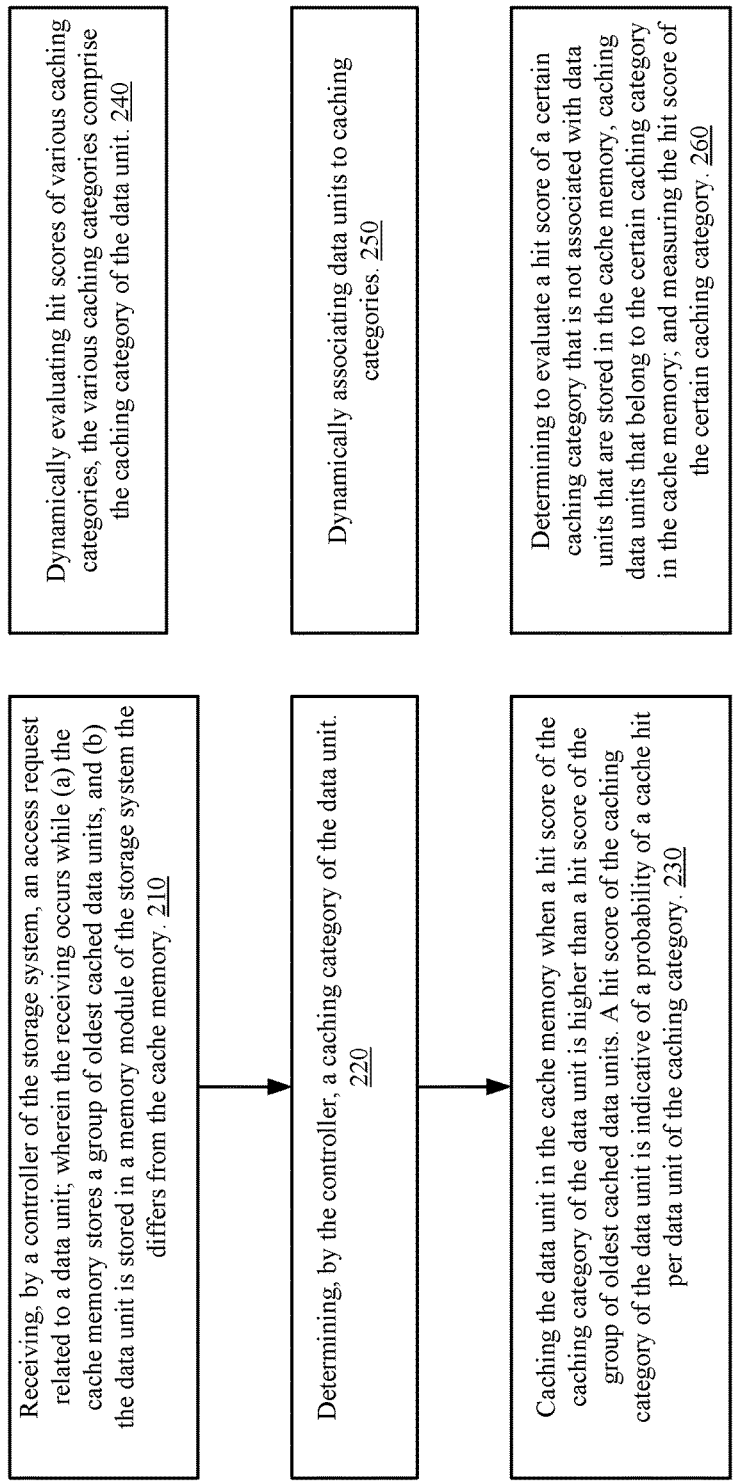
FIG. 5 illustrates an example of a method.
Figure 6:
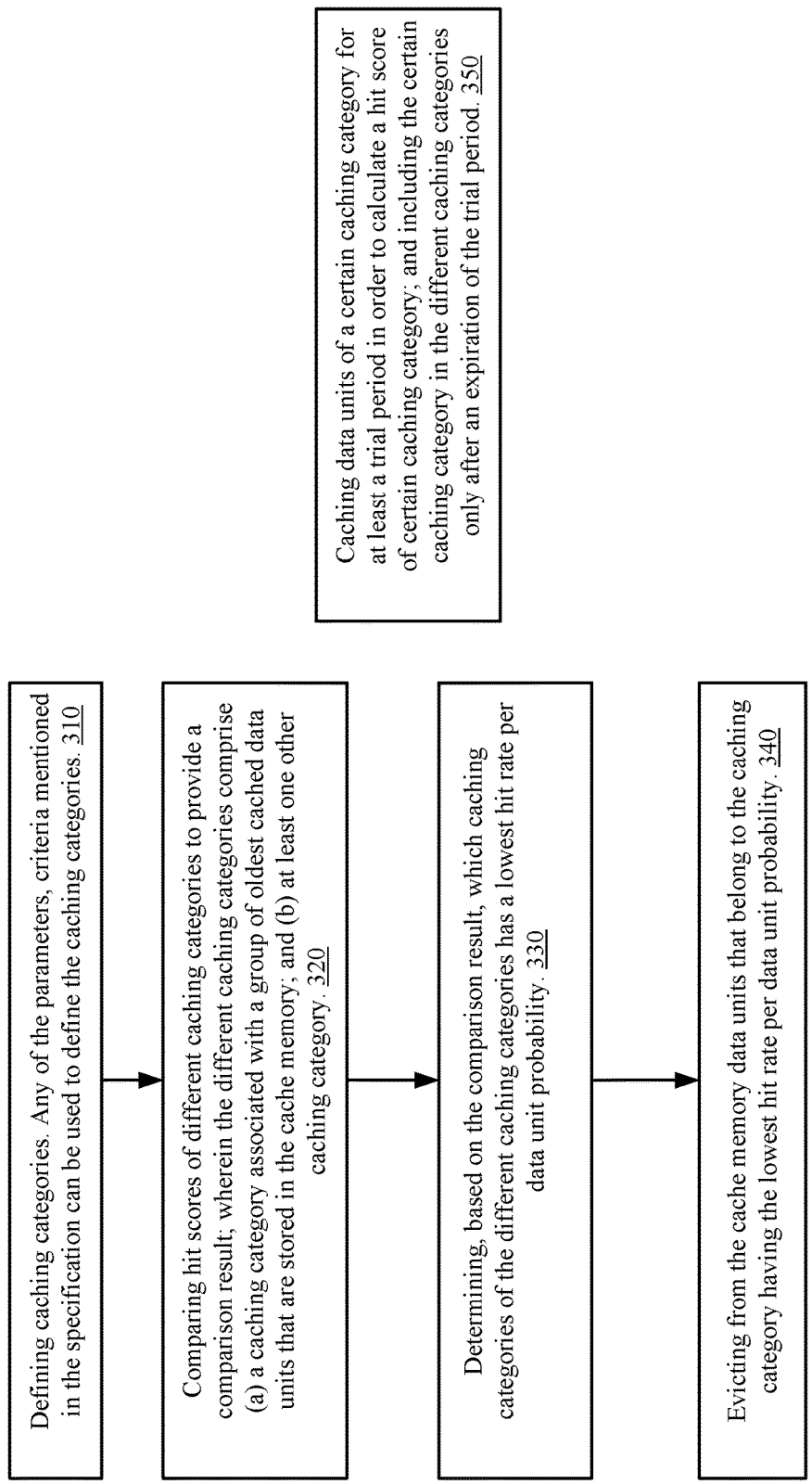
FIG. 6 illustrates an example of a method.

FIG. 5 illustrates an example of method 200.

Method 200 is a method for managing a cache memory of a storage system.

Method 200 may include a sequence of steps 210, 220 and 230. Method 200 may also include steps 240, 250 and 260.

Step 210 may include receiving, by a controller of the storage system, an access request related to a data unit; wherein the receiving occurs while (a) the cache memory stores a group of oldest cached data units, and (b) the data unit is stored in a memory module of the storage system that differs from the cache memory. For example, the data unit is stored is a permanent storage device, such as a hard disk or flash device. The data unit may be further stored in another cache memory. The access request may be for reading or writing the data unit to or from the memory module of the storage system that differs from the cache memory, or the access request may be for admitting the data unit into the cache memory.

Step 220 may include determining, by the controller, a caching category of the data unit. The determining may be according to a combination of characteristics of the access request.

Step 230 may include caching the data unit in the cache memory when a hit score of the caching category of the data unit is higher than a hit score of the group of oldest cached data units. A hit score of the caching category of the data unit is indicative of a probability of a cache hit per data unit of the caching category. The probability of a cache hit may refer to the probability until eviction or probability within a certain time-window. The probability may be determined according to measured hits towards the cached data units of the caching category, as occurred in the past. A hit score of the group of oldest cached data units is indicative of a probability of a cache hit per data unit of the group of oldest cached data units. Step 230 may include determining whether to cache the data unit based on a comparison of the hit score of the caching category of the data unit and the hit score of the group of oldest cached data units. Step 230 may include preventing from caching the data unit in the cache memory when a hit score of the caching category of the data unit is lower than a hit score of the group of oldest cached data units.

Step 240 may include dynamically evaluating hit scores of various caching categories, the various caching categories comprise the caching category of the data unit. Accordingly—the hit scores may be calculated multiple times—and be adapted to the dynamic behavior of the cache. The hit score of a certain caching category may be calculated, for example, when the controller receives an access request towards a data unit that is associated with the certain caching category. The hit score may be otherwise calculated periodically, or upon eviction of data units from the cache memory.

Step 250 may include dynamically associating data units to caching categories. The caching category of the same data unit can be changed upon each reception of access request towards the data unit, since the access parameters (or other parameters that are used to determine the caching category) may be changed in different access requests. Therefore, the associating is dynamic.

The determining of the caching category of the data unit may be based on at least one out of (a) one or more access request parameters that are included in the access request, (b) a logical address included in the access request, (c) a time of reception of the access request, (d) a pattern formed by a group of access requests that comprise the access request, (e) a length (size) of the data unit, (f) a type of the access request (read request or write request), (g) a pattern formed by a group of access requests that includes the caching category of the data unit.

Step 260 of determining to evaluate a hit score of a certain caching category that is not associated with data units that are stored in the cache memory, caching a sample of data units that belong to the certain caching category in the cache memory; and measuring the hit score of the certain caching category. The measuring may be executed during a trial period during which data units of the certain caching category are not evicted from the cache memory. Step 260 may include calculating the hit score of the sample based on hits towards the sample and evaluating a hit score of the entire caching category based on the hit score of the sample, as if all the data units of the certain caching category would have been cached. In case the hit score of the certain caching category is higher than the hit score of the group of oldest data units, then step 260 may include determining to cache any data unit (or all data units) of the certain caching category, that is requested to be accessed.

FIG. 5 illustrates an example of method 300.

Method 300 is a method for managing a cache memory of a storage system.

Method 300 may include a sequence of steps 310, 320 and 330. Method 300 may also include step 350.

Step 310 may include defining caching categories. Any of the parameters, criteria mentioned in the specification can be used to define the caching categories.

Step 320 may include comparing hit scores of different caching categories to provide a comparison result; wherein the different caching categories comprise (a) a caching category associated with a group of oldest cached data units that are stored in the cache memory; and (b) at least one other caching category. Step 320 may include comparing a hit score of at least one caching category with a hit score of the group of oldest cached data units. The hit scores are indicative of hits per data unit probabilities in the respective caching categories.

Step 330 may include determining, based on the comparison result, which caching categories of the different caching categories has a lowest hit rate per data unit probability. Step 330 may include determining whether the hit score of the at least one caching category is lower than the hit score of the group of oldest cached data units.

Step 340 may include evicting from the cache memory data units that belong to the caching category having the lowest hit rate per data unit probability. Step 340 may include evicting, from the cache memory, data units that belong to the at least one caching category if it is determined that the hit score of the at least one caching category is lower than the hit score of the group of oldest cached data units.

Step 350 may include caching data units of a certain caching category for at least a trial period in order to calculate a hit score of certain caching category; and including the certain caching category in the different caching categories only after an expiration of the trial period. Step 350 may include caching a sample (a portion) of the at least one caching category if it is determined that the hit score of the at least one caching category is lower than the hit score of the group of oldest cached data units, calculating a hit score of the at least one caching category based on a hit score of the portion.

Caching-Category-Based Aging

Cached data of different caching categories may have different number of hits versus the time passed since caching. Some caching categories may have most of the hits in the first few hours after the data was cached, while for other caching categories it may take longer until the hits become negligible.

Graphs 161, 162 and 163 of FIG. 4 illustrates the function of hits versus time for three different caching categories, where all three demonstrate different curves. Graph 161 is an exponential declining curve that reaches a negligible asymptotic value around time t1. Graph 162 is an exponential declining curve that declines faster and reaches a negligible asymptotic value around time t2. Graph 163 is a step function that drops to zero at t3. All curves and other curves (not shown) reflect types of behaviors that can be observed for hits of cached data of different caching categories.

The symbols t1, t2 and t3 illustrate the points in time beyond which caching is not efficient. The points in time t1, t2 and t3 represent the preferred eviction time (the eviction point in time), for data units in the corresponding caching categories. These eviction points in time can be determined according to the estimated or calculated percentage of hits before the eviction point in time (the percentage should be above a first threshold, e.g., 97%), or the estimated percentage of hits after the eviction point in time (the percentage should be below a second threshold, e.g., 3%), etc. The caching time is defined as the time period starting at t=0 and ending at the eviction point in time.

The aging of data units within each caching category is configured according to the eviction point in time. For example, the aging of data units that belong to the caching category whose curve is illustrated in graph 161 should be twice as slow as the aging of data units that belong to the caching category whose curve is illustrated in graph 162, since t1 is twice as long as t2.

The aging should decline to a value that triggers eviction, in accordance with the determined eviction time. For example: when a data unit of a certain caching category is cached for a time that is at least the determined caching time for that caching category, the aging parameter should have a value that meets a criteria for eviction.

According to embodiments of the present invention, the hits versus time is monitored for the different caching categories, so as to determine the caching time or the eviction point in time. The aging parameter can be configured so that it decays according to the required caching time.

The aging can be controlled by setting different maximum values to aging parameters of different caching categories. The decaying of the aging parameter may also be controlled by using different reduction units. For example, faster aging data units are assigned with lower initial TTL, while slower aging data units are assigned with a higher initial TTL. Alternatively, the pace of reducing the aging parameter can be controlled, faster pace (reflected by e.g., larger reduction units) for faster aging data units, and slower pace for slower aging data units (reflected by e.g., smaller reduction units). Controlling the pace of the aging, can better fit situations of dynamic changes of caching categories.

Various techniques can be used for determining the caching time. According to one embodiment, for each caching category, the number of hits related to cached data units of the caching category can be monitored constantly or at various time points. The trend of the curve is estimated and if the trend shows declining, the eviction point in time can be set when it is estimated that most of the hits are already performed.

According to another embodiment for determining the caching time, at least three values of caching time will be determined. A majority caching time is being used for calculating the aging behavior for the majority of the cached data units of a caching category. An increased caching time, which is longer than the majority caching time, will be used for a sample of cached data units of the caching category. A decreased caching time, which is shorter than the majority caching time, will be used for another sample of cached data units of the caching category.

As an initial step, all the caching categories may be assigned with an arbitrary value of caching time for the three types of caching time.

If the sample that uses the increased caching time, for a certain caching category, shows a substantial improvement in the hit ratio, the increased caching time will be used for the majority of cached data units, and the increased and decreased values will be changed accordingly.

If the sample that uses the decreased caching time, for the certain caching category, shows no substantial improvement in the hit ratio, the decreased caching time can be used for the majority of cached data units, and the increased and decreased values will be changed accordingly.

The aging behavior will be adjusted to the caching time (majority, increased and decreased caching times)

The sampling of cached data units that ages differently from the majority of the cached data units of the caching category is maintained constantly, even if the aging scheme of the majority is determined to work well. This is due to the dynamic behavior of cached data that can be changed over time.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

For example, any digital computer system can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein. The methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers. The term "non-transitory" is used to exclude transitory, propagating signals, but to otherwise include any volatile or non-volatile computer memory technology suitable to the application including, for example, distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by a communication network.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also, for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or"an" limits any particular claim containing such introduced claim element to inventions containing only one such element, even when the same claim includes the introductory phrases "one or more" or"at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

I claim:

1. A method for managing a cache memory of a storage system, the method comprises:
    receiving, by a controller of the storage system, an access request related to a data unit; wherein the receiving occurs while (a) the cache memory stores a group of oldest cached data units, and (b) the data unit is stored in a memory module of the storage system that differs from the cache memory;
    evaluating a hit score of the group of oldest cached data units;
    determining, by the controller, a caching category of the data unit;
    dynamically evaluating a hit score of the caching category of the data unit, based on (a) a ratio between a number of cached data units that belong to the caching category and a number of total cached data units, and (b) number of hits in the caching category;
    determining whether to admit the data unit into the cache memory, including:
        preventing from admitting the data unit into the cache memory when the hit score of the caching category of the data unit is lower than the hit score of the group of oldest cached data units; and
        caching the data unit in the cache memory when the hit score of the caching category of the data unit is higher than the hit score of the group of oldest cached data units; wherein the hit score of the caching category of the data unit is indicative of a probability of a cache hit per data unit of the caching category.

2. The method according to claim 1 comprising dynamically evaluating hit scores of various caching categories, the various caching categories comprise the caching category of the data unit.

3. The method according to claim 1 comprising dynamically associating data units to caching categories.

4. The method according to claim 1 wherein the determining of the caching category of the data unit is based on access request parameters that are included in the access request.

5. The method according to claim 1 wherein the determining of the caching category of the data unit is based on a logical address included in the access request.

6. The method according to claim 1 wherein the determining of the caching category of the data unit is based on at least one parameter out of (a) a time of reception of the access request, (b) a pattern formed by a group of access requests that comprise the access request, (c) a length of the data unit, and (d) a type of the access request, wherein the type of the access request is selected from a read request and a write request.

7. The method according to claim 1 wherein the determining of the caching category of the data unit is based on a time of reception of the access request.

8. The method according to claim 1 wherein the access request belongs to a group of access requests, and wherein the determining of the caching category of the data unit is based on a pattern formed by the group of access requests.

9. The method according to claim 1 wherein the determining of the caching category of the data unit is based on a type of the access request, wherein the type of the access request is selected from a read request and a write request.

10. The method according to claim 1 further comprising determining to evaluate a hit score of a certain caching category that is not associated with data units that are stored in the cache memory; caching a sample of data units that belong to the certain caching category in the cache memory even when the cache memory is full; and measuring the hit score of the certain caching category.

11. A computer program product that is non transitory and stores instructions for:
receiving, by a controller of the storage system, an access request related to a data unit; wherein the receiving occurs while (a) the cache memory stores a group of oldest cached data units, and (b) the data unit is stored in a memory module of the storage system that differs from the cache memory;
evaluating a hit score of the group of oldest cached data units;
determining, by the controller, a caching category of the data unit;
dynamically evaluating the hit score of the caching category of the data unit, based on (a) a ratio between the number of cached data units that belong to the caching category and a number of total cached data units, and (b) number of hits in the caching category;
determining, by the controller, whether to admit the data unit into the cache memory; and
caching the data unit in the cache memory when the hit score of the caching category of the data unit is higher than the hit score of the group of oldest cached data units.

12. A method for managing a cache memory of a storage system, the method comprises:
receiving, by a controller of the storage system, an access request related to a data unit; wherein the receiving occurs while (a) the cache memory stores a group of oldest cached data units, and (b) the data unit is stored in a memory module of the storage system that differs from the cache memory;
evaluating a hit score of the group of oldest cached data units;
determining, by the controller, a caching category of the data unit;
dynamically evaluating the hit score of the caching category of the data unit by incrementing the hit score upon each hit on a cached data unit of the caching category of the data unit by a number that reflects a ration between the number of cached data units that belong to the caching category and a number of total cached data units;
determining whether to admit the data unit into the cache memory, including:
preventing from admitting the data unit into the cache memory when the hit score of the caching category of the data unit is lower than the hit score of the group of oldest cached data units; and
caching the data unit in the cache memory when the hit score of the caching category of the data unit is higher than the hit score of the group of oldest cached data units; wherein the hit score of the caching category of the data unit is indicative of a probability of a cache hit per data unit of the caching category.

13. A computer program product that is non transitory and stores instructions for:
receiving, by a controller of the storage system, an access request related to a data unit; wherein the receiving occurs while (a) the cache memory stores a group of oldest cached data units, and (b) the data unit is stored in a memory module of the storage system that differs from the cache memory;
evaluating a hit score of the group of oldest cached data units;
determining, by the controller, a caching category of the data unit;
dynamically evaluating the hit score of the caching category of the data unit by incrementing the hit score upon each hit on a cached data unit of the caching category of the data unit by a number that reflects a ration between the number of cached data units that belong to the caching category and a number of total cached data units;
determining, by the controller, whether to admit the data unit into the cache memory; and
caching the data unit in the cache memory when flail the hit score of the caching category of the data unit is higher than the hit score of the group of oldest cached data units.

* * * * *